(12) United States Patent
Qin

(10) Patent No.: US 11,989,272 B2
(45) Date of Patent: May 21, 2024

(54) HUMAN-MACHINE VERIFICATION METHOD, DEVICE AND STORAGE MEDIUM

(71) Applicant: BAIDU ONLINE NETWORK TECHNOLOGY (BEIJING) CO., LTD., Beijing (CN)

(72) Inventor: Yangyang Qin, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 412 days.

(21) Appl. No.: 17/437,971

(22) PCT Filed: Nov. 24, 2020

(86) PCT No.: PCT/CN2020/131071
§ 371 (c)(1),
(2) Date: Sep. 10, 2021

(87) PCT Pub. No.: WO2022/000959
PCT Pub. Date: Jan. 6, 2022

(65) Prior Publication Data
US 2022/0350870 A1 Nov. 3, 2022

(30) Foreign Application Priority Data

Jun. 28, 2020 (CN) .......................... 202010600857.2

(51) Int. Cl.
*G06F 21/32* (2013.01)
*G06F 3/01* (2006.01)
*G06V 10/764* (2022.01)

(52) U.S. Cl.
CPC .............. *G06F 21/32* (2013.01); *G06F 3/013* (2013.01); *G06V 10/764* (2022.01)

(58) Field of Classification Search
CPC .... G06V 40/18; G06V 40/193; G06F 16/783; G06F 16/51; G04N 7/147; H04N 7/15
See application file for complete search history.

(56) References Cited

U.S. PATENT DOCUMENTS 7,430,306 B1 *  9/2008  Osborn ................... G06Q 20/40
                                                       340/5.82
7,986,816 B1 *  7/2011  Hoanca ................... G06V 40/18
                                                       382/280
(Continued)

FOREIGN PATENT DOCUMENTS

CN   103065077 A   4/2013
CN   104579658 A   4/2015
(Continued)

OTHER PUBLICATIONS

Extended European Search Report of European patent application No. 20942505.7 dated Aug. 7, 2023, 9 pages.
(Continued)

*Primary Examiner* — Yosef Kassa
(74) *Attorney, Agent, or Firm* — Brooks Kushman P.C.

(57) ABSTRACT

A human-machine verification method and apparatus, a device and a storage medium, relating to the fields of Internet security technologies and computer vision technologies are disclosed. An implementation includes: receiving an identity verification request sent by a requester, and collecting an eyeball gaze point track on an identity verification page, the identity verification request including identity verification information; identifying whether the identity verification information is correct based on pre-stored user identity information; if the identity verification information is correct, performing classification based on the eyeball gaze point track on the identity verification page using a first classification model, and outputting a first probability value indicating whether the requester is a real person or a (Continued)

machine; and determining based on the first probability value that the requester is the real person or the machine, and outputting an identity verification result indicating that identity verification is passed or fails.

20 Claims, 11 Drawing Sheets

(56) References Cited

U.S. PATENT DOCUMENTS

| | | | | |
|---|---|---|---|---|
| 8,892,697 | B2* | 11/2014 | Nema | G06F 21/32 |
| | | | | 713/172 |
| 9,111,181 | B2* | 8/2015 | Allen | G06F 21/6245 |
| 9,785,793 | B2* | 10/2017 | Lacey | G06F 21/316 |
| 9,811,242 | B2* | 11/2017 | Tsou | G06V 40/18 |
| 2016/0307038 | A1 | 10/2016 | Skogoe et al. | |
| 2017/0034147 | A1 | 2/2017 | Wang et al. | |
| 2017/0109513 | A1 | 4/2017 | Skogoe et al. | |
| 2018/0196930 | A1 | 7/2018 | Ahuja et al. | |

FOREIGN PATENT DOCUMENTS

| | | |
|---|---|---|
| CN | 105426827 A | 3/2016 |
| CN | 107158707 A | 9/2017 |
| CN | 206807609 U | 12/2017 |
| CN | 107622188 A | 1/2018 |
| CN | 107995979 A | 5/2018 |
| CN | 108900700 A | 11/2018 |
| CN | 109815665 A | 5/2019 |
| CN | 110114777 A | 8/2019 |
| CN | 110765434 A | 2/2020 |
| CN | 111259369 A | 6/2020 |
| CN | 111324878 A | 6/2020 |
| CN | 111881431 A | 11/2020 |
| JP | 2016527605 | 9/2016 |
| JP | 2016224510 | 12/2016 |
| JP | 2018517998 | 7/2018 |
| JP | 2020064668 A | 4/2020 |
| KR | 20190038923 A | 4/2019 |

OTHER PUBLICATIONS

International Search Report of PCT/CN2020/131071 dated Mar. 26, 2021, 12 pages.

Office Action of Korean application No. 10-20227027380 issued Mar. 26, 2024, 4 pages.

* cited by examiner

HUMAN-MACHINE VERIFICATION METHOD, DEVICE AND STORAGE MEDIUM

The present application is the U.S. national phase of PCT Application No. PCT/CN2020/131071, filed on Nov. 24, 2020, which claims priority to Chinese Patent Application No. 2020106008572, entitled "Human-Machine Verification Method and Apparatus, Device and Storage Medium", filed on Jun. 28, 2020, which are hereby incorporated by reference in their entireties.

TECHNICAL FIELD

The present application relates to the field of Internet technologies, and particularly relates to the fields of Internet security technologies and computer vision technologies, and more particularly to a human-machine verification method, a device and a storage medium.

BACKGROUND

With a development of Internet technologies, a series of dark and gray industrial chains based on machine attacks are produced, and behaviors, such as user induction, fake data production, theft of information of other people, anonymous illegal crimes, or the like, are implemented on the Internet by a machine simulating a real-person interactive operation. According to public data, an official organization of Facebook finds that 5% of accounts are fake accounts, a number of fake accounts found by leading Internet companies in China every year is also in an order of millions to hundreds of millions, and currently, a black and gray industrial market reaches a scale of hundreds of billions only in China. As such, how to identify real person access and machine attack has become an arena where Internet enterprises and even the electronic financial industry competes against the black and gray industry.

SUMMARY

Various aspects of the present application provide a human-machine verification method, a device and a storage medium, so as to improve a reliability of human-machine verification.

According to a first aspect, there is provided a human-machine verification method, including:
  receiving an identity verification request sent by a requester, and collecting an eyeball gaze point track on an identity verification page, the identity verification request including identity verification information;
  identifying whether the identity verification information is correct based on pre-stored user identity information;
  if the identity verification information is correct, performing classification based on the eyeball gaze point track on the identity verification page using a first classification model, and outputting a first probability value indicating whether the requester is a real person or a machine; and
  determining based on the first probability value that the requester is the real person or the machine, and outputting an identity verification result indicating that identity verification is passed or fails.

According to a second aspect, there is provided an electronic device, including: at least one processor; and
  a memory connected with the at least one processor communicatively;
  the memory stores instructions executable by the at least one processor to enable the at least one processor to a human-machine verification method, which includes:
  receiving an identity verification request sent by a requester, and collecting an eyeball gaze point track on an identity verification page; wherein the identity verification request comprises identity verification information;
  identifying whether the identity verification information is correct based on pre-stored user identity information;
  if the identity verification information is correct, performing classification based on the eyeball gaze point track on the identity verification page using a first classification model, and outputting a first probability value indicating whether the requester is a real person or a machine; and
  determining based on the first probability value that the requester is the real person or the machine, and outputting an identity verification result indicating that identity verification is passed or fails.

According to a third aspect, there is provided a non-transitory computer readable storage medium including instructions, which, when executed by a computer, causes the computer to carry out a human-machine verification method, which includes:
  receiving an identity verification request sent by a requester, and collecting an eyeball gaze point track on an identity verification page; wherein the identity verification request comprises identity verification information;
  identifying whether the identity verification information is correct based on pre-stored user identity information;
  if the identity verification information is correct, performing classification based on the eyeball gaze point track on the identity verification page using a first classification model, and outputting a first probability value indicating whether the requester is a real person or a machine; and
  determining based on the first probability value that the requester is the real person or the machine, and outputting an identity verification result indicating that identity verification is passed or fails.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

In order to more clearly explain the technical solutions of the embodiments of the present application, the drawings to be used in the descriptions of the embodiments or the prior art are briefly introduced as follows. Apparently, the following drawings illustrate some embodiments of the present application, and a person skilled in the art can obtain other drawings from these drawings without any creative effort. The drawings are only used for better understanding the present solution and do not constitute a limitation of the present application. In the drawings.

DETAILED DESCRIPTION OF EMBODIMENTS

Figure 1:
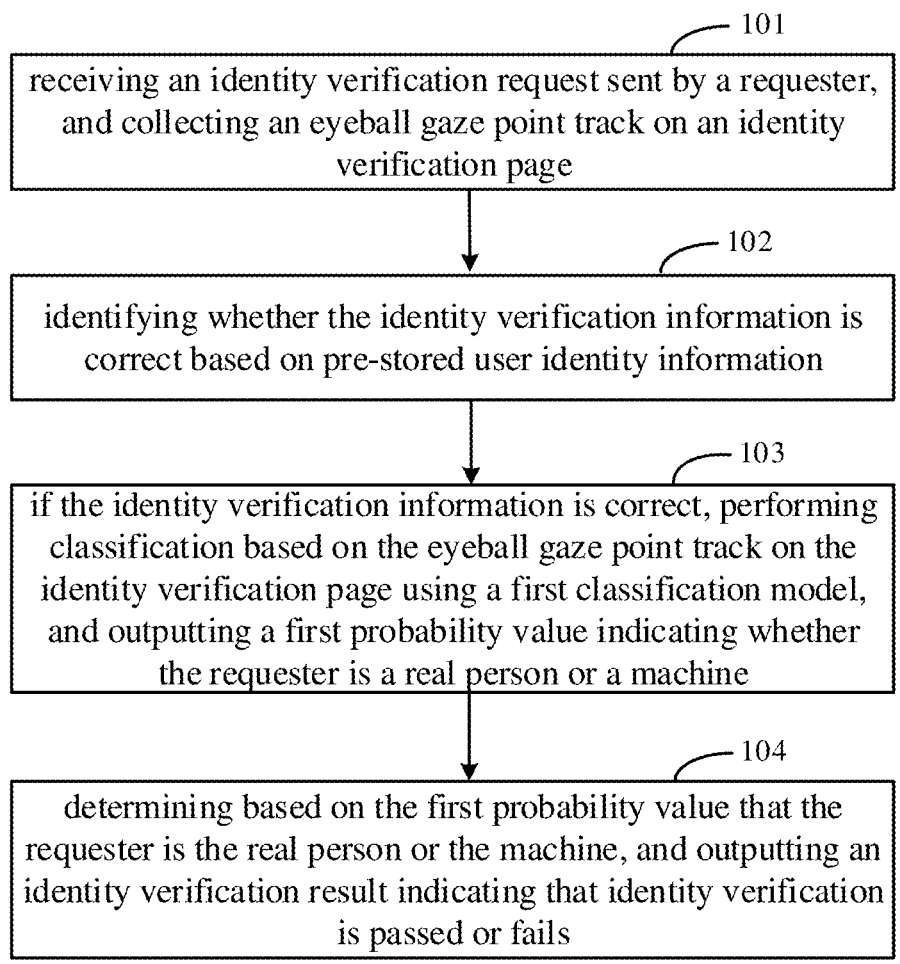
FIG. 1 is a schematic diagram according to a first embodiment of the present application.

The following part will illustrate exemplary embodiments of the present application with reference to the drawings, including various details of the embodiments of the present application for a better understanding. The embodiments should be regarded only as exemplary ones. Therefore, those skilled in the art should appreciate that various changes or modifications can be made with respect to the embodiments described herein without departing from the scope and spirit of the present application. Similarly, for clarity and conciseness, the descriptions of the known functions and structures are omitted in the descriptions below.

Apparently, the embodiments to be described are merely a part rather than all of the embodiments of the present application. All other embodiments obtained by a person of ordinary skill in the art based on the embodiments of the present application without creative efforts shall fall within the protection scope of the present application.

It should be noted that a terminal in the embodiments of the present application may include, but is not limited to, a mobile phone, a personal digital assistant (PDA), a wireless handheld device, a tablet computer, a personal computer (PC), an MP3 player, an MP4 player, a wearable device (for example, smart glasses, smart watches, smart bracelets, or the like), a smart home device, and other smart devices.

In addition, the term "and/or" only describes an association relationship between associated objects, and indicates that three relationships may exist. For example, A and/or B may indicate three cases: only A exists; both A and B exist; and only B exists. In addition, in this specification, the symbol "I" generally indicates that associated objects have a relationship of "or".

In order to identify the real person access and the machine attack, user-behavior interactive verification is mainly adopted in a prior art, and an operation behavior of a user on a terminal screen is collected to determine a real person operation or the machine attack, and the operation behavior mainly includes clicking a specified screen position and sliding a certain slider to the specified position, so as to finish a certain specified operation, such as clicking Chinese characters, clicking pictures, sliding to make a picture angle positive or make a jigsaw complete, or the like. In order to bypass the user-behavior interactive verification, abundant behavior simulation methods have been developed at present, in which on the one hand, a real person behavior track may be reproduced for simulation verification, and on the other hand, a simulation operation behavior may be automatically generated by a machine.

In order to increase a machine attack cost in a prior art, a verification difficulty is improved constantly; for example, a simple click slide is upgraded to arithmetic operations, picture identification, position identification, sequence identification, or the like. A machine operates after understanding a purpose of the operation; taking a click of a figure in a certain orientation of a block of a certain color as an example, the machine is necessary to first understand information, such as the color, the block, a position, or the like, and then perform the specific clicking operation. This method has a higher machine attack cost, but increases a difficulty of understanding by a real person, thus greatly reducing user experiences.

In order to solve the above-mentioned problem, a human-machine verification method and apparatus, an electronic device, and a readable storage medium are proposed to improve a reliability of human-machine verification and user experiences at the same time.

FIG. 1 is a schematic diagram according to a first embodiment of the present application, and as shown in FIG. 1, a method includes:

101: receiving an identity verification request sent by a requester, and collecting an eyeball gaze point track on an identity verification page.

The identity verification request includes identity verification information.

102: identifying whether the identity verification information is correct based on pre-stored user identity information.

103: if the identity verification information is correct, performing classification based on the eyeball gaze point track on the identity verification page using a first classification model, and outputting a first probability value indicating whether the requester is a real person or a machine.

104: determining based on the first probability value that the requester is a real person or a machine, and outputting an identity verification result indicating that identity verification is passed or fails.

It should be noted that part or all of execution subjects of 101-104 may be configured as an application located at a local terminal, or a functional unit, such as a plug-in or software development kit (SDK) provided in the application located at the local terminal, or the like, or a processing engine located at a network-side server, which is not particularly limited in this embodiment.

It may be understood that the application may be configured as a native application (nativeApp) installed at the terminal, or a web application (webApp) of a browser at the terminal, which is not limited in this embodiment.

In other words, the identity verification request sent by the requester is received, and the eyeball gaze point track on the identity verification page is collected; whether the identity verification information in the identity verification request is correct is identified based on the pre-stored user identity information; if the identity verification information is correct, the classification is performed based on the eyeball gaze point track on the identity verification page using the first classification model, and the first probability value indicating whether the requester is a real person or a machine is output; and it is determined based on the first probability value that the requester is a real person or a machine, and the identity verification result indicating that identity verification is passed or fails is output. In the present application, during verification of an identity of the requester, an eyeball moving track of the requester is verified to realize human-machine safety verification, and whether the requester is a real person or a machine attack is identified automatically, thus improving a reliability of the human-machine safety verification.

In this embodiment, during verification of an identity of the requester, an eyeball moving track of the requester is verified to realize human-machine safety verification, and whether the requester is a real person or a machine attack is identified automatically, thus improving a reliability of the human-machine safety verification.

In addition, with the technical solution of the present application, since the eyeball gaze point track on the identity verification page is collected automatically to verify the eyeball moving track of the requester during the verification of the identity of the requester, a user operation is avoided, and the eyeball moving track may be verified under the condition that a user hardly or slightly perceives, which does not increase a difficulty of understanding by a real person, and meanwhile improves user experiences.

Optionally, in a possible implementation of this embodiment, eyeball gaze point tracks of different users within a period of historical time may be collected as positive samples to analyze a historical behavior similarity, fake eyeball gaze point tracks which do not conform to the historical behavior similarity are generated as negative samples on this basis, and then, the first classification model is trained under supervision using the positive and negative samples, such that after trained, the first classification model may output the probability value that the requester is a real person or a machine based on the input eyeball gaze point track.

In a specific implementation, for a real-person user (a real person), an eyeball gaze point position of the user on a terminal screen (corresponding to a page, such as an identity verification page, an interactive verification page, or the like) at a certain moment may be located with assistance of an infrared light source and an infrared camera; for example, infrared light may be emitted by the infrared light source, the eyeball of the user may reflect an infrared light signal after receiving it, the infrared camera may locate a position of the eyeball of the user on the terminal screen (corresponding to the page), i.e., the eyeball gaze point position, by collecting the infrared light signal on the terminal screen, and the eyeball gaze point track may be obtained after collection of the eyeball gaze point positions within a period of time. Thus, the eyeball gaze point position may be tracked by the infrared light source and the infrared camera. However, in a case of a machine attack, the machine is difficult to generate somatosensory data of eyeball rotation, and if a terminal device cannot detect the eyeball gaze point position and thus not track any eyeball gaze point track with the assistance of the infrared light source and the infrared camera, the machine attack is determined with a high probability. If a machine attacker uses a plurality of photographs for 3D modeling to simulate pass of living body verification, the attack cost for eyeball rotation is also quite high, thus increasing the machine attack cost without increasing a user verification cost.

Optionally, the method according to the embodiment shown in FIG. 1 may further include: if the identity verification information is incorrect, outputting an identity verification result indicating that the identity verification fails.

In this embodiment, if the identity verification information is incorrect, the identity of the user may be considered to be illegal, and subsequent human-machine verification is avoided, thus saving computing resources, and improving verification efficiency.

Optionally, in a possible implementation of this embodiment, in 101, upon reception of a request of the requester for accessing the identity verification page, the eyeball gaze point track on the identity verification page is started to be collected, and the identity verification request sent after the requester inputs a user name and a password is received; the identity verification information includes the user name and the password.

In this embodiment, the eyeball gaze point track on the identity verification page may be started to be collected upon reception of the request of the requester for accessing the identity verification page, such that the eyeball gaze point track for human-machine verification may be collected in the process of verifying the identity of the user, thus improving an efficiency of the whole verification process.

Figure 2:
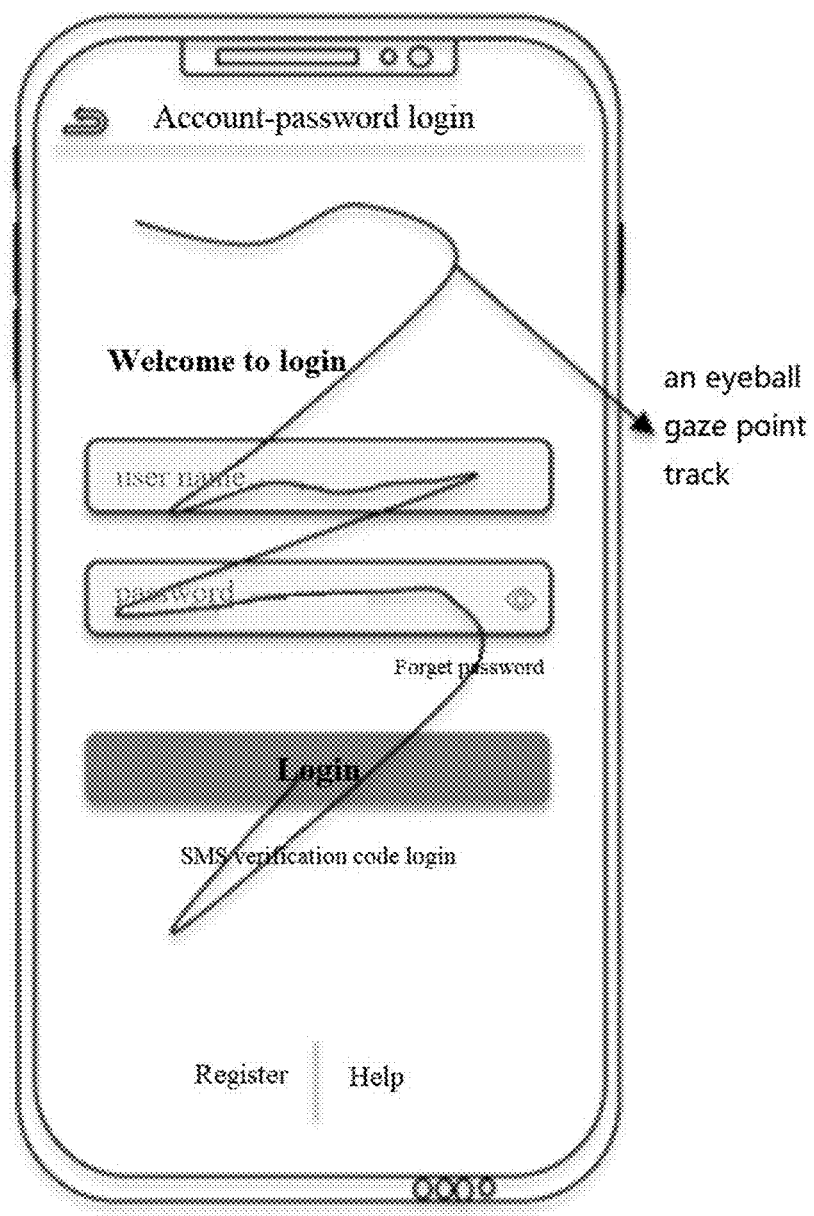
FIG. 2 is a schematic diagram of an identity verification page and an eyeball gaze point track in the first embodiment of the present application.

FIG. 2 is a schematic diagram of the identity verification page and the eyeball gaze point track in the first embodiment of the present application. The identity verification page exemplarily provides a common account-password login interface which includes a user-name input interface, a password input interface and a login button, eyeball gaze point positions of the user at different moments after the user enters the account-password login interface may be collected and sequentially modeled according to a time sequence, so as to form an eyeball gaze point track, and FIG. 2 exemplarily shows one eyeball gaze point track. The conventional machine attack does not have the eyeball gaze point track, and the eyeball gaze point track obtained by a 3D modeling or video recording process is obviously different from the real person track.

For example, in a case of a real person, after entering the account-password login interface, the user firstly notices the upper left corner, then starts to input the user name and the password, and finally clicks the login button to complete login, such that the eyeball gaze positions of the user at different moments after entering the account-password login interface may be simulated and sequentially modeled according to the time sequence, so as to form the eyeball gaze point track.

With the eyeball gaze point track tracked on the identity verification page shown in FIG. 2, security verification may be completed without perception of the user, no disturbance is caused to the user, and a somatosensory technology is adopted, such that the machine attack cost is quite high.

Optionally, in a possible implementation of this embodiment, in 104, if it is determined based on the first probability value that a probability value of the requester being a real person is greater than a probability value of the requester being a machine, the requester may be determined as a real person and the identity verification result indicating that the identity verification is passed is output; or if it is determined based on the first probability value that the probability value of the requester being a machine is greater than a first preset value (for example, 0.5), the requester is determined as a machine and the identity verification result that the identity verification fails is output; or if it is determined based on the first probability value that the probability value of the requester being a real person is greater than a second preset value (for example, 0.6), the requester is determined as a real person and the identity verification result that the identity verification is passed is output.

The first preset value and the second preset value may be set according to actual requirements and adjusted in real time according to requirements, and specific values of the first preset value and the second preset value are not limited in the present application.

In this embodiment, whether the requester is a real person or a machine may be determined according to the probability value of the requester being a real person or a machine, such that a criterion for determining the requester to be a real person or a machine is more objective, thus facilitating an improvement in an efficiency for determining whether the requester is a real person or a machine.

If it is determined based on the first probability value that the probability value of the requester being a real person is equal to the probability value of the requester being a machine, or that the probability value of the requester being a machine is greater than a third preset value (0.4) but not greater than the first preset value (0.5), or that the probability value of the requester being a real person is greater than a fourth preset value (0.5) but not greater than the second preset value (0.6), it is difficult to determine whether the requester is a real person or a machine, and an interactive behavior verification may be further performed on the user, as shown in the following 307.

The third preset value and the fourth preset value may be set according to actual requirements and adjusted in real time according to requirements, and specific values of the third preset value and the fourth preset value are not limited in the present application.

Figure 3:
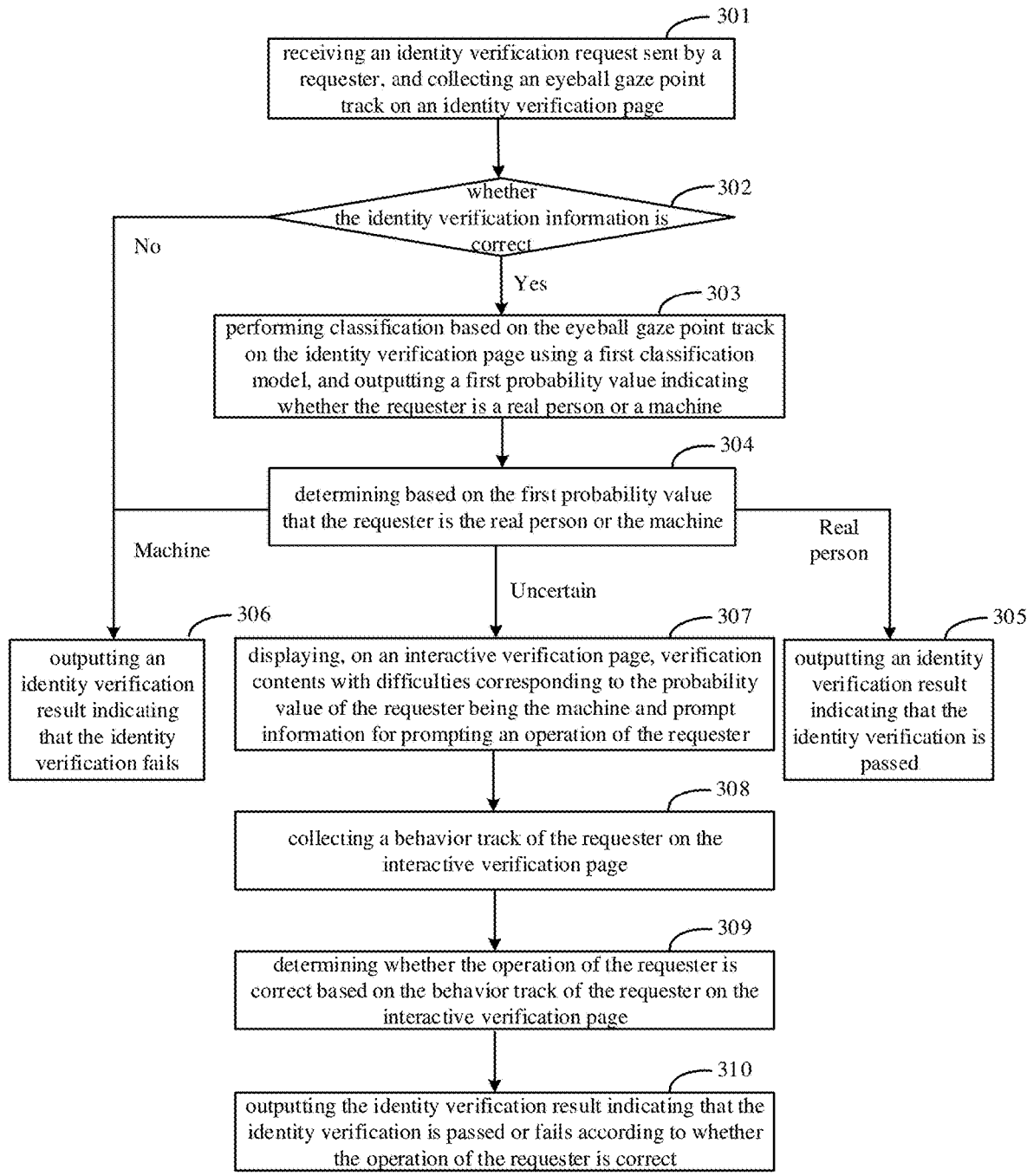
FIG. 3 is a schematic diagram according to a second embodiment of the present application.

FIG. 3 is a schematic diagram according to a second embodiment of the present application. As shown in FIG. 3, a method includes:

301: receiving an identity verification request sent by a requester, and collecting an eyeball gaze point track on an identity verification page.

The identity verification request includes identity verification information.

302: identifying whether the identity verification information is correct based on pre-stored user identity information.

If the identity verification information is correct, 303 is executed; if the identity verification information is incorrect, 306 is executed.

303: performing classification based on the eyeball gaze point track on the identity verification page using a first classification model, and outputting a first probability value indicating whether the requester is a real person or a machine.

304: determining based on the first probability value that the requester is a real person or a machine.

If the requester is determined to be a real person, 305 is executed; if the requester is determined to be a machine, 306 is executed; if the requester is unable to be determined (uncertain) to be a real person or a machine, 307 is performed.

In a specific implementation process, if it is determine based on the first probability value that a probability value of the requester being a real person is equal to a probability value of the requester being a machine, or that the probability value of the requester being a machine is greater than the third preset value but not greater than the first preset value, or that the probability value of the requester being a real person is greater than the fourth preset value but not greater than the second preset value, the requester is unable to be determined to be a real person or a machine.

305: outputting the identity verification result indicating that the identity verification is passed.

After 305, the subsequent flow of this embodiment is not executed.

306: outputting the identity verification result indicating that the identity verification fails.

After 306, the subsequent flow of this embodiment is not executed.

307: displaying on the interactive verification page verification contents with difficulties corresponding to the probability value of the requester being a machine and prompt information for prompting an operation of the requester.

Figure 4A:
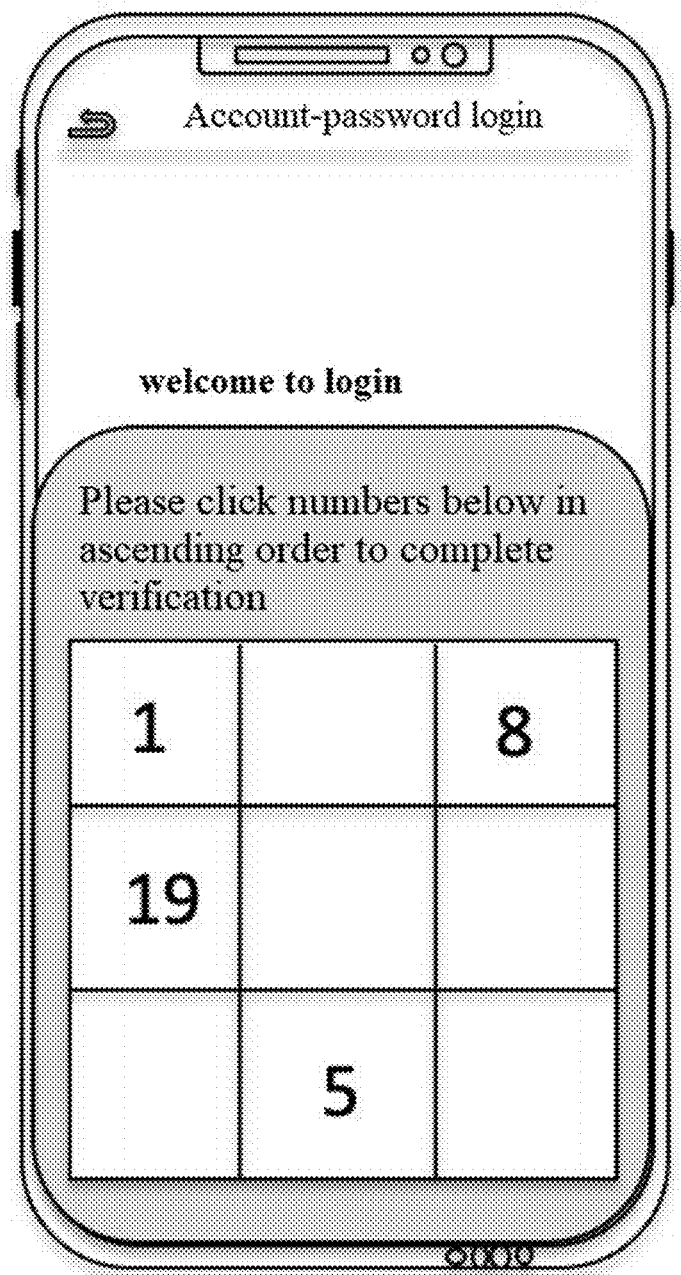
FIGS. 4a, 4b and 4c are schematic diagrams of verification contents with different difficulties and prompt information in the second embodiment of the present application.
Figure 4B:
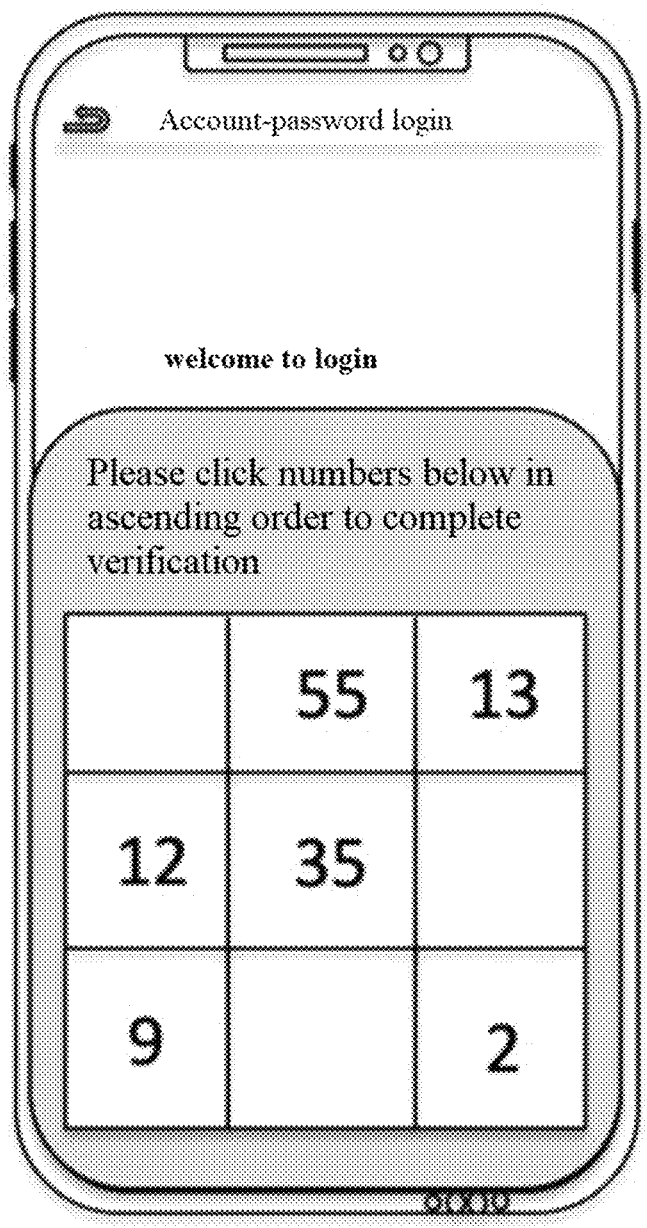
Figure 4C:
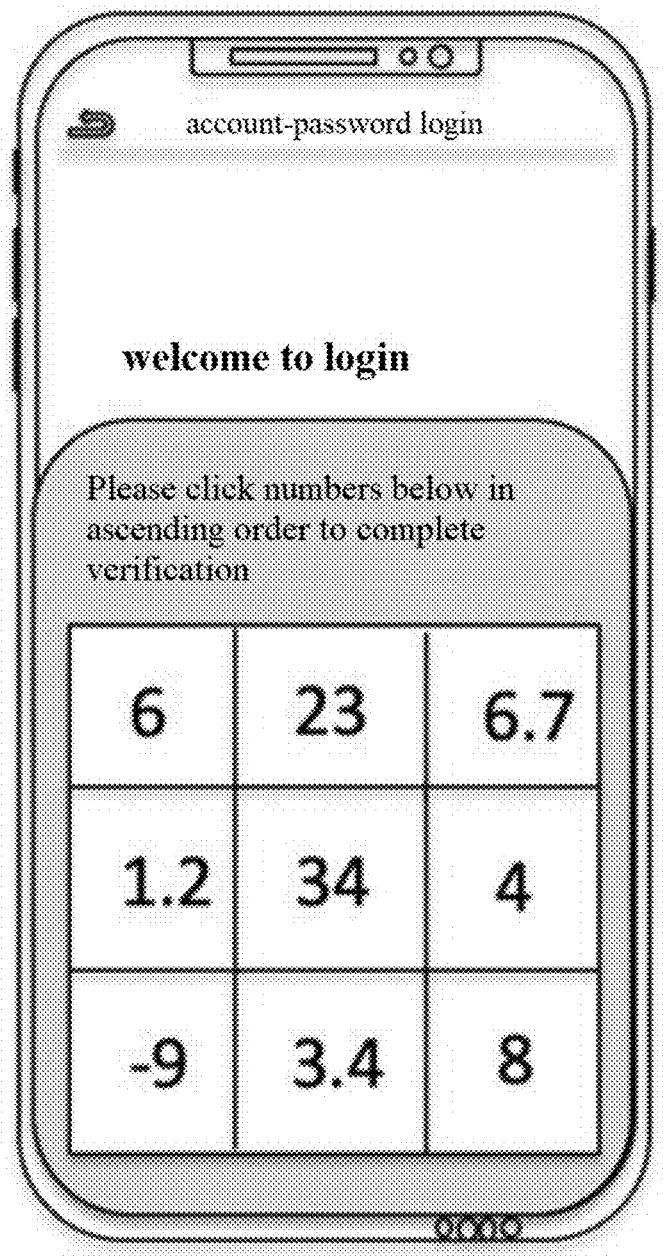

When human-machine identification is unable to be performed on the eyeball gaze point track of the requester on the identity verification page, the verification contents with different difficulties and the prompt information are displayed on the interactive verification page for further verification of the requester. FIGS. 4a, 4b and 4c are schematic diagrams of verification contents with different difficulties and prompting information in the second embodiment of the present application. As shown in FIGS. 4a, 4b and 4c, the verification contents include 9 blocks in total, numbers randomly appear in the 9 blocks according to a random parameter (the random parameter may be preset according to a risk level), each block may or may not have a number, the number may be 0, a positive integer, a negative integer, or even a floating-point number, and the user is prompted to click the numbers in the blocks in an ascending order. The user clicks the numbers from small to large, and if the clicking order is correct, the requester has a correct operation.

This interactive behavior verification mode provides verification contents with different difficulties; the larger the probability value of the requester being a real person, the lower the difficulty of the verification content; for example, the user is only required to click the verification content provided in FIG. 4a 4 times, and the size of the number in the block is easier to judge. The greater the probability value of the requester being a machine, the greater the difficulty of the verification content, the user is required to click the verification content provided in FIG. 4b 6 times, and the numbers in the blocks are all positive integers. If the probability value of the requester being a machine is larger, the more difficult verification content shown in FIG. 4c may be displayed, the numbers in the blocks contain negative integers, positive integers and floating-point numbers, and the machine has more difficulty in completing verification.

308: collecting a behavior track of the requester on the interactive verification page.

Each time the user clicks specific contents (for example, the block) in the verification content, an operation behavior position may be generated on the terminal screen, and the behavior track may be obtained by collecting the operation behavior positions corresponding to the specific contents in the verification content clicked by the user at different moments. Similarity analysis and a supervised behavior modeling operation may be performed on the eyeball gaze point track and the user behavior track; meanwhile, a cross modeling operation may also be performed on the eyeball gaze point track and the user behavior track; for example, a multivariate time sequence model of the eyeball gaze point track and the behavior track is established.

309: determining whether the operation of the requester is correct based on the behavior track of the requester on the interactive verification page.

310: outputting the identity verification result indicating that the identity verification is passed or fails according to whether the operation of the requester is correct.

Specifically, if the operation of the requester is correct, the identity verification result indicating that the identity verification is passed is output; if the operation of the requester is incorrect, the identity verification result indicating that the identity verification fails is output.

In this embodiment, the verification contents with different difficulties corresponding to the probability value of the requester being a machine may be displayed on the interactive verification page, so as to further perform the interactive behavior verification on the user; the larger the probability value of the requester being a machine, the higher the difficulty of the verification content, and the higher the difficulty of completing verification by the machine in consideration of the eyeball gaze point track on the identity verification page and the behavior track of the requester, thereby improving an accuracy and a reliability of human-machine verification to improve a network security. Under the worst condition that the attacker successfully simulates the eyeball gaze point track of the identity verification page and a real person operation or the machine attack is difficult to judge, identification may be performed by the behavior sequence track, and almost all machine attacks may be intercepted by the eyeball gaze point track on the identity verification page in conjunction with the behavior track.

Figure 5:
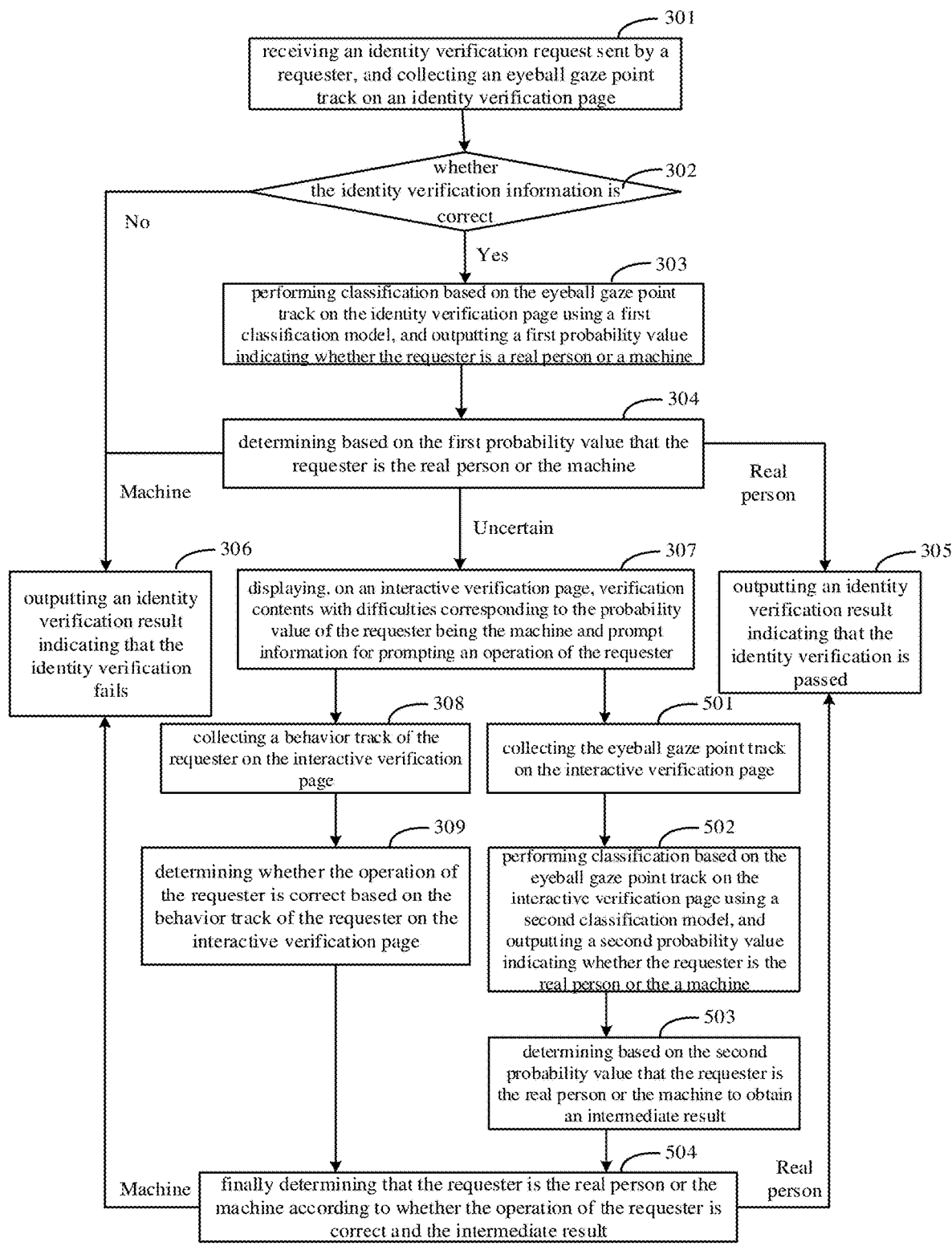
FIG. 5 is a schematic diagram according to a third embodiment of the present application.

FIG. 5 is a schematic diagram according to a third embodiment of the present application, and as shown in FIG. 5, on the basis of the embodiment shown in FIG. 3, in the process of performing the interactive behavior verification on the user, after the verification content and the prompt information are presented by the interactive verification page, the method may further include:

501: collecting an eyeball gaze point track on the interactive verification page.

502: performing classification based on the eyeball gaze point track on the interactive verification page using a second classification model, and outputting a second probability value indicating whether the requester is a real person or a machine.

503: determining based on the second probability value that the requester is a real person or a machine to obtain an intermediate result.

Correspondingly, 310 may be implemented as follows:

504: finally determining that the requester is a real person or a machine according to whether the operation of the requester is correct and the intermediate result, and outputting the identity verification result indicating that the identity verification is passed or fails.

Specifically, if the operation of the requester is correct and the intermediate result is that the requester is a real person, the requester is finally determined to be a real person, and then, 305 is executed; if the operation of the requester is incorrect and/or the intermediate result is that the requester is a machine, the requester is finally determined to be a machine, and 306 is performed.

In this embodiment, in the process of performing the interactive behavior verification on the user, two tracks may be collected: the eyeball gaze point track on the interactive verification page and the behavior track generated by the user clicking the verification content; the interactive behavior verification is performed on the user based on the two tracks at the same time, and when verifications of both tracks are passed, the requester may be finally determined to be a real person; otherwise, the requester may be finally determined to be a machine as long as verification of one track fails, thereby improving the reliability of the interactive behavior verification to further improve the reliability of human-machine safety verification.

Optionally, in the embodiment shown in FIG. 5, the eyeball gaze point track on the interactive verification page may be compared with the eyeball gaze point track on the identity verification page to judge whether they are consistent, so as to obtain a comparison result. Correspondingly, in 504, the identity verification result indicating that the identity verification is passed or fails is output specifically according to whether the operation of the requester is correct, the intermediate result, and the comparison result.

Since the same user has the same or similar browsing habits on different pages, in this embodiment, the eyeball gaze point track on the interactive verification page is compared with the eyeball gaze point track on the identity verification page to judge whether they are consistent, so as to obtain a comparison result, and whether the requester is a real person or a machine is determined according to whether the operation of the requester is correct, the intermediate result, and the comparison result at the same time, thus further improving the accuracy and the reliability of the human-machine verification result.

Optionally, in a possible implementation of this embodiment, if the operation of the requester is correct, the intermediate result is that the requester is a real person, and the comparison result is that the eyeball gaze point track on the interactive verification page is consistent with the eyeball gaze point track on the identity verification page, the requester is finally determined to be a real person, and the identity verification result indicating that the identity verification is passed is output. Otherwise, if the operation of the requester is incorrect, and/or the intermediate result is that the requester is a machine, and/or the comparison result is that the eyeball gaze point track on the interactive verification page is inconsistent with the eyeball gaze point track on the identity verification page, the requester is finally determined to be a machine, and the identity verification result indicating that the identity verification fails is output.

In this embodiment, the requester may be finally determined to be a real person only when the operation of the requester is correct, the intermediate result is that the requester is a real person, and the comparison result is that the eyeball gaze point track on the interactive verification page is consistent with the eyeball gaze point track on the identity verification page, and the requester is considered to be a machine when any one of the three conditions is not met, such that the difficulty of human-machine verification is improved, thereby improving the accuracy and the reliability of the man-machine verification result.

It should be noted that for simplicity of description, the above-mentioned embodiments of the method are described as combinations of a series of acts, but those skilled in the art should understand that the present application is not limited by the described order of acts, as some steps may be performed in other orders or simultaneously according to the present application. Further, those skilled in the art should also understand that the embodiments described in this specification are preferred embodiments and that acts and modules referred to are not necessary for the present application.

In the above-mentioned embodiments, the descriptions of the respective embodiments have respective emphasis, and for parts that are not described in detail in a certain embodiment, reference may be made to the related descriptions of other embodiments.

Figure 6:
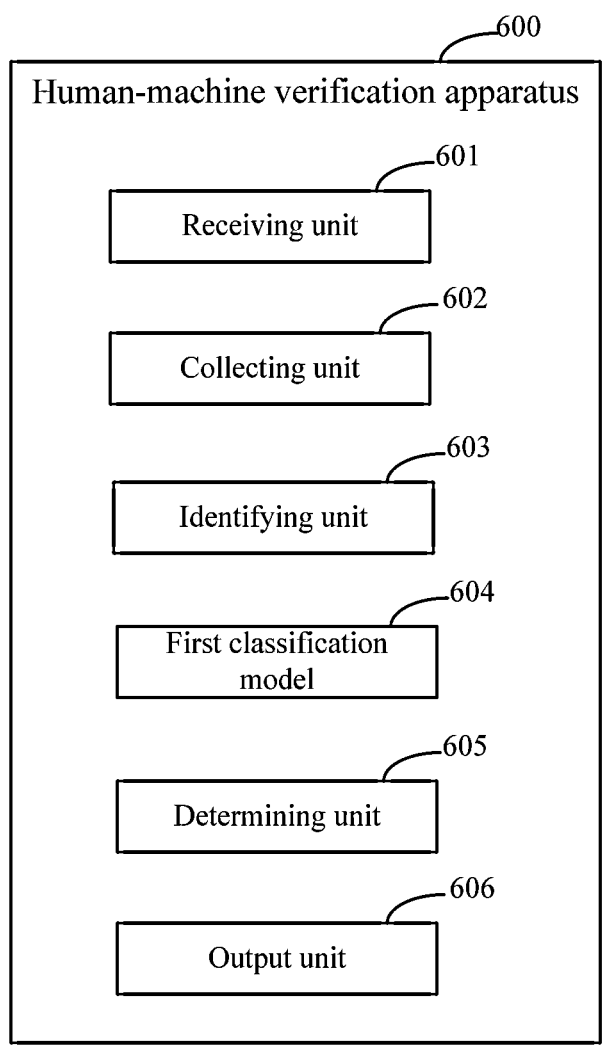
FIG. 6 is a schematic diagram according to a fourth embodiment of the present application.

FIG. 6 is a schematic diagram according to a fourth embodiment of the present application. A human-machine verification apparatus 600 according to this embodiment may include a receiving unit 601, a collecting unit 602, an identifying unit 603, a first classification model 604, a determining unit 605 and an output unit 606. The receiving unit 601 is configured to receive an identity verification request sent by a requester, the identity verification request including identity verification information; the collecting unit 602 is configured to collect an eyeball gaze point track on an identity verification page; the identifying unit 603 is configured to identify whether the identity verification information is correct based on pre-stored user identity information; the first classification model 604 is configured to, if the identity verification information is correct, perform classification based on the eyeball gaze point track on the identity verification page, and output a first probability value indicating whether the requester is a real person or a machine; the determining unit 605 is configured to determine based on the first probability value that the requester is a real person or a machine; and the output unit 606 is configured to output an identity verification result indicating that identity verification is passed or fails according to the requester being a real person or a machine.

It should be noted that part or all of execution subjects of the human-machine verification apparatus according to this embodiment may be configured as an application located at a local terminal, or a functional unit, such as a plug-in or software development kit (SDK) provided in the application located at the local terminal, or the like, or a processing engine located at a network-side server, which is not particularly limited in this embodiment.

It may be understood that the application may be configured as a native application (nativeApp) installed at the terminal, or a web application (webApp) of a browser at the terminal, which is not limited in this embodiment.

In this embodiment, during verification of an identity of the requester, an eyeball moving track of the requester is verified to realize human-machine safety verification, and whether the requester is a real person or a machine attack is identified automatically, thus improving a reliability of the human-machine safety verification.

In addition, with the technical solution of the present application, since the eyeball gaze point track on the identity verification page is collected automatically to verify the eyeball moving track of the requester during the verification of the identity of the requester, a user operation is avoided, and the eyeball moving track may be verified under the condition that a user hardly or slightly perceives, which does not increase a difficulty of understanding by a real person, and meanwhile improves user experiences.

Optionally, in the human-machine verification apparatus 600 according to the embodiment shown in FIG. 6, the output unit 606 is further configured to, if the identity verification information is incorrect, outputting an identity verification result indicating that the identity verification fails.

Optionally, in a possible implementation of this embodiment, the receiving unit 601 is specifically configured to receive a request of the requester for accessing the identity verification page, and to receive an identity verification request sent after the requester inputs a user name and a password; the identity verification information includes the user name and the password. Correspondingly, the collecting unit 602 is specifically configured to: in response to the reception of the request of the requester for accessing the identity verification page, start to collect the eyeball gaze point track on the identity verification page.

Optionally, in a possible implementation of this embodiment, the determining unit 605 is specifically configured to determine that the requester is a real person if it is determined based on the first probability value that a probability value of the requester being a real person is greater than a probability value of the requester being a machine, or determine that the requester is a machine if it is determined based on the first probability value that the probability value of the requester being a machine is greater than a first preset value, or determine that the requester is a real person if it is determined based on the first probability value that the probability value of the requester being a real person is greater than a second preset value.

Figure 7:
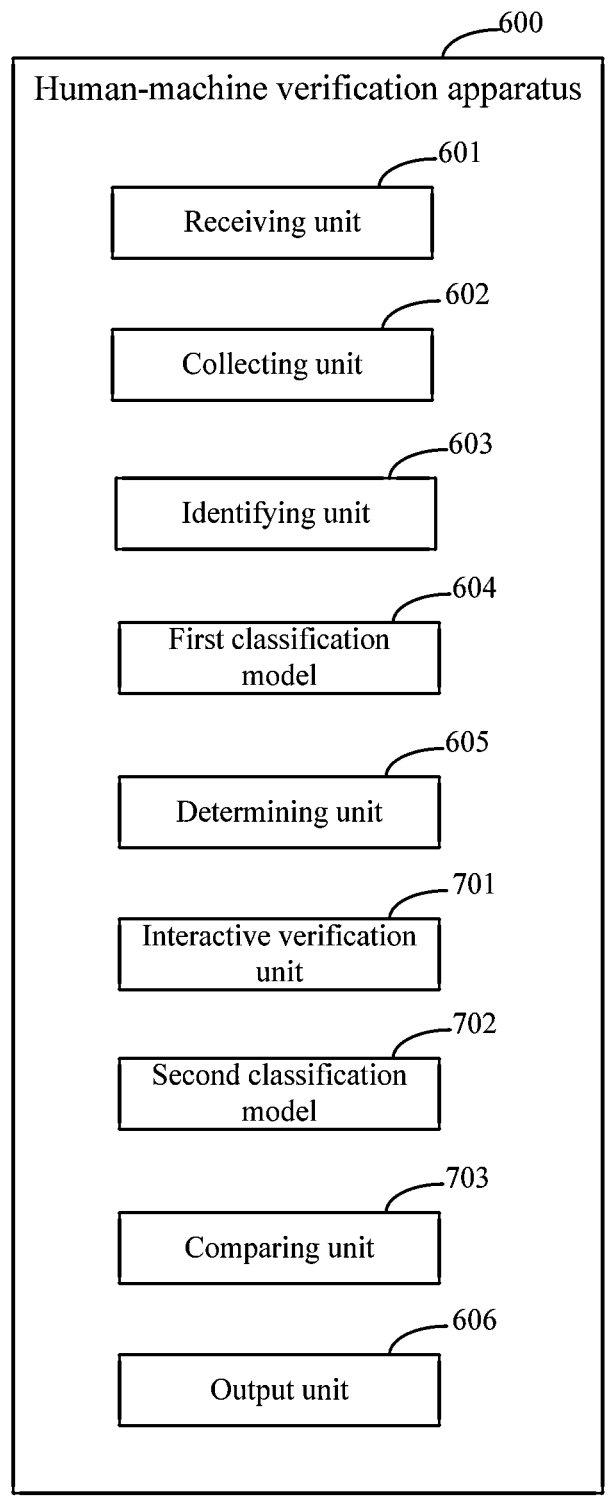
FIG. 7 is a schematic diagram according to a fifth embodiment of the present application.

FIG. 7 is a schematic diagram according to a fifth embodiment of the present application, and as shown in FIG. 7, on the basis of the embodiment shown in FIG. 6, the human-machine verification apparatus 600 according to this embodiment may further include: an interactive verification unit 701 configured to: if it is determined based on the first probability value that the probability value of the requester being a real person is equal to the probability value of the requester being a machine, or that the probability value of the requester being a machine is greater than a third preset value but not greater than the first preset value, or that the probability value of the requester being a real person is greater than a fourth preset value but not greater than the second preset value, display on an interactive verification page verification contents with difficulties corresponding to the probability value of the requester being a machine and prompt information for prompting an operation of the requester; collect a behavior track of the requester on the interactive verification page; and determine whether the operation of the requester is correct based on the behavior track of the requester on the interactive verification page. Correspondingly, the determining unit 605 is further configured to determine whether the requester is a real person or a machine according to whether the operation of the requester is correct.

Optionally, in the human-machine verification apparatus 600 according to the embodiment shown in FIG. 6 or 7, the collecting unit 602 is further configured to collect the eyeball gaze point track on the interactive verification page. Referring to FIG. 7, the human-machine verification apparatus 600 according to this embodiment may further include: a second classification model 702 configured to perform classification based on the eyeball gaze point track on the interactive verification page, and output a second probability value indicating whether the requester is a real person or a machine.

Correspondingly, in this embodiment, the determining unit 605 is specifically configured to: determine whether based on the second probability value that the requester is a real person or a machine to obtain an intermediate result; and finally determine whether the requester is a real person or a machine according to whether the operation of the requester is correct and the intermediate result.

Optionally, referring to FIG. 7, the human-machine verification apparatus 600 according to this embodiment may further include: a comparing unit 703 configured to compare whether the eyeball gaze point track on the interactive verification page is consistent with the eyeball gaze point track on the identity verification page, so as to obtain a comparison result. Correspondingly, the determining unit 605 is further configured to finally determine whether the requester is a real person or a machine according to whether the operation of the requester is correct, the intermediate result and the comparison result.

Optionally, in a possible implementation of this embodiment, the determining unit 605 is specifically configured to: if the operation of the requester is correct, the intermediate result is that the requester is a real person, and the comparison result is that the eyeball gaze point track on the interactive verification page is consistent with the eyeball gaze point track on the identity verification page, finally determine that the requester is a real person; and if the operation of the requester is incorrect, and/or the intermediate result is that the requester is a machine, and/or the comparison result is that the eyeball gaze point track on the interactive verification page is inconsistent with the eyeball gaze point track on the identity verification page, finally determine that the requester is a machine.

It should be noted that the method according to the embodiments corresponding to FIGS. 1 to 5 may be implemented by the human-machine verification apparatus according to the above-mentioned embodiments of FIGS. 6 to 7. For detailed description, reference may be made to relevant contents in the embodiments corresponding to FIGS. 1 to 5, and the detailed description is not repeated herein.

Figure 8:
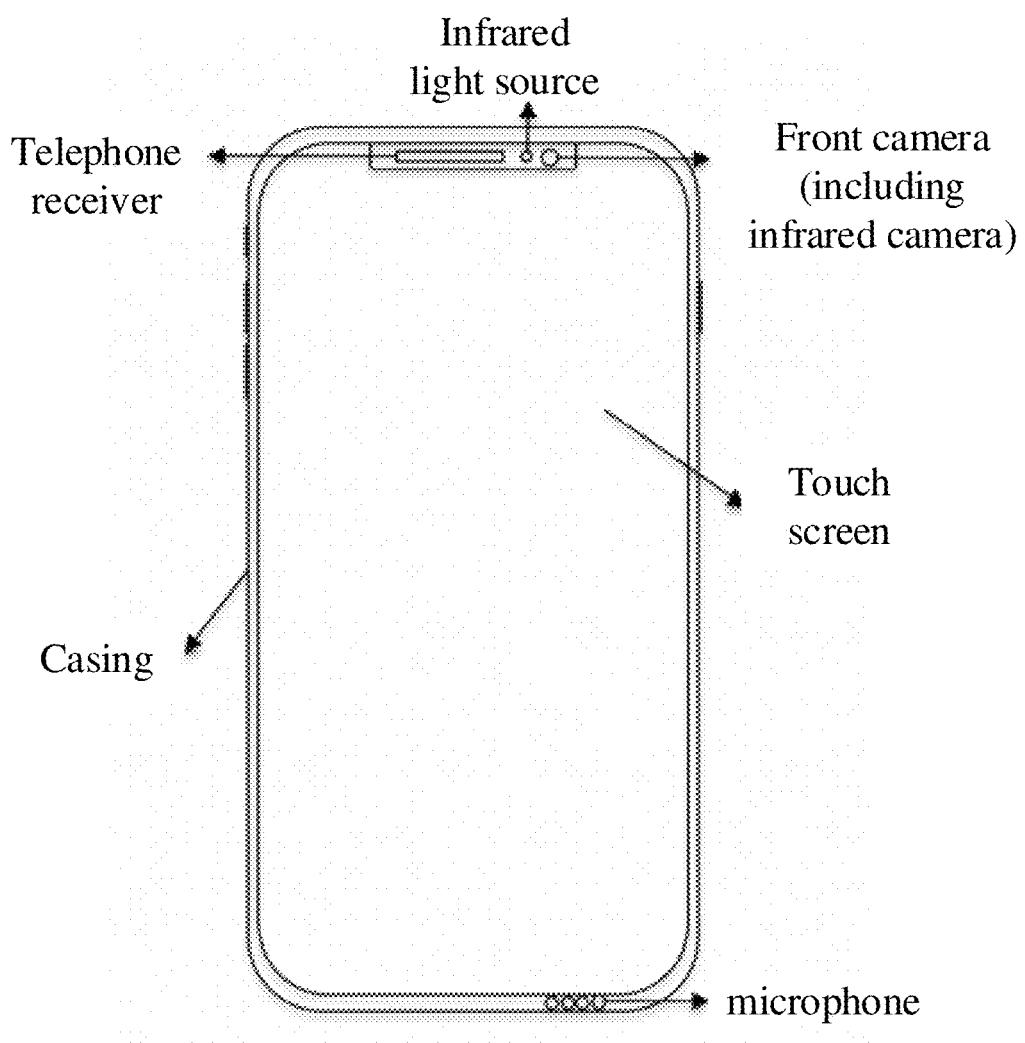
FIG. 8 is a schematic diagram of a terminal device configured to implement the embodiment of the present application.

FIG. 8 is a schematic diagram of a terminal device configured to implement the embodiment of the present application. The terminal device may be configured as any portable computing device with an eyeball gaze point tracking function, the example in FIG. 8 is a smart phone, and it is known to those skilled in the art that other common notebook computers, tablet computers, desktop computers, and smart televisions with similar functions are also applicable to the present application. As shown in FIG. 8, the terminal device is provided with a telephone receiver, a microphone, a touch screen, an infrared light source, a front camera (including an infrared camera) and a casing. The telephone receiver may be configured to send voice to the user and the external world, or output voice information for prompting the operation of the user to the user; the microphone may be configured to receive voice signals of the user and the external world; the touch screen may be configured to display interactive information with the user and receive an interactive signal input by the user; the infrared light source may be configured as one or more infrared light emitting diodes or infrared laser diodes, and may illuminate the eyeballs of the user, such that the infrared camera may conveniently capture the pupil positions of the eyeballs of the user, so as to position a focusing position (i.e., the gaze point position) of the user on the touch screen; the front camera (including the infrared camera) may be configured to take pictures and videos, and the infrared camera may be configured to achieve the eyeball gaze point tracking function in the present application. Eyeball picture information acquired by the infrared camera may determine specific focused areas and positions of eyeballs of the user on the touch screen.

According to embodiments of the present application, there are also provided an electronic device and a non-transitory computer readable storage medium including instructions.

Figure 9:
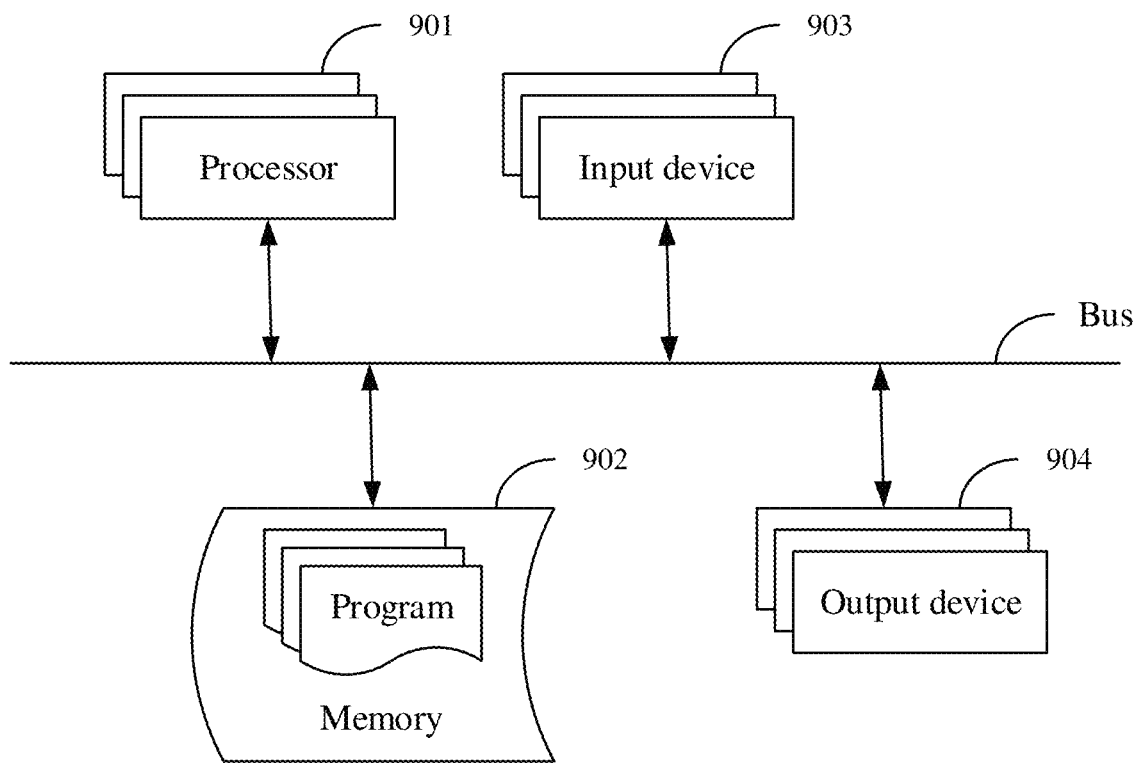
FIG. 9 is a schematic diagram of an electronic device configured to implement the human-machine verification method according to an embodiment of the present application.

FIG. 9 is a schematic diagram of an electronic device configured to implement the human-machine verification method according to the embodiment of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile devices, such as personal digital processors, cellular telephones, smart phones, wearable devices, and other similar computing devices. The components shown herein, their connections and relationships, and their functions, are meant to be exemplary only, and are not meant to limit implementation of the present application described and/or claimed herein.

As shown in FIG. 9, the electronic device includes one or more processors 901, a memory 902, and interfaces configured to connect the components, including high-speed interfaces and low-speed interfaces. The components are interconnected using different buses and may be mounted at a common motherboard or in other manners as desired. The processor may process instructions for execution within the electronic device, including instructions stored in or at the memory to display graphical information for a graphical user interface (GUI) at an external input/output device, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 9, one processor 901 is taken as an example.

The memory 902 is configured as the non-transitory computer readable storage medium according to the present application. The memory stores instructions which are executable by the at least one processor to cause the at least one processor to perform a human-machine verification method according to the present application. The non-transitory computer readable storage medium according to the present application stores computer instructions for causing a computer to perform the human-machine verification method according to the present application.

The memory 902 which is a non-transitory computer readable storage medium may be configured to store non-transitory software programs, non-transitory computer executable programs and units, such as program instructions/units corresponding input device to the human-machine verification method according to the embodiments of the present application (for example, the receiving unit 601, the collecting unit 602, the identifying unit 603, the first classification model 604, the determining unit 605 and the output unit 606 shown in FIG. 6). The processor 901 executes various functional applications and data processing of a server, that is, implements the human-machine verification method according to the above-mentioned embodiments, by running the non-transitory software programs, instructions, and units stored in the memory 902.

The memory 902 may include a program storage area and a data storage area, and the program storage area may store an operating system and an application program required for at least one function; the data storage area may store data created according to use of the electronic device for implementing the human-machine verification method according to the embodiments of the present application, or the like. Furthermore, the memory 902 may include a high-speed random access memory, or a non-transitory memory, such as at least one magnetic disk storage device, a flash memory device, or other non-transitory solid state storage devices. In some embodiments, optionally, the memory 902 may include memories remote from the processor 901, and such remote memories may be connected via a network to the electronic device for implementing the human-machine verification method according to the embodiments of the present application. Examples of such a network include, but are not limited to, the Internet, intranets, local area networks, mobile communication networks, and combinations thereof.

The electronic device for the human-machine verification method may further include an input device 903 and an output device 904. The processor 901, the memory 902, the input device 903 and the output device 904 may be connected by a bus or other means, and FIG. 9 takes the connection by a bus as an example.

The input device 903 may receive input numeric or character information and generate key signal input related to user settings and function control of the electronic device for implementing the human-machine verification method according to the embodiments of the present application, such as a touch screen, a keypad, a mouse, a track pad, a touch pad, a pointing stick, one or more mouse buttons, a trackball, a joystick, or the like. The output device 904 may include a display device, an auxiliary lighting device (for example, an LED) and a tactile feedback device (for example, a vibrating motor), or the like. The display device may include, but is not limited to, an LCD (liquid crystal display), an LED (light emitting diode) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmitting data and instructions to, a storage system, at least one input device, and at least one output device.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, PLDs (programmable logic devices)) for providing machine instructions and/or data to a programmable processor, including a machine readable medium which receives machine instructions as a machine readable signal. The term "machine readable signal" refers to any signal for providing machine instructions and/or data for a programmable processor.

To provide interaction with a user, the systems and technologies described here may be implemented on a computer having: a display device (for example, a cathode ray tube (CRT) or liquid crystal display (LCD) monitor) for displaying information to a user; and a keyboard and a pointing device (for example, a mouse or a trackball) by which a user may provide input for the computer. Other kinds of devices may also be used to provide interaction with a user; for example, feedback provided to a user may be any form of sensory feedback (for example, visual feedback, auditory feedback, or tactile feedback); and input from a user may be received in any form (including acoustic, language or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: an LAN (local area network), a WAN (wide area network) and the Internet.

A computer system may include a client and a server. Generally, the client and the server are remote from each other and interact through the communication network. The relationship between the client and the server is generated by virtue of computer programs which run on respective computers and have a client-server relationship to each other.

With the technical solution of the embodiment of the present application, the identity verification request sent by the requester is received, and the eyeball gaze point track on the identity verification page is collected; whether the identity verification information in the identity verification request is correct or not is identified based on the pre-stored user identity information; if the identity verification information is correct, the classification is performed based on the eyeball gaze point track on the identity verification page using the first classification model, and the first probability value that the requester is a real person or a machine is output; and whether the requester is a real person or a machine is determined based on the first probability value, and the identity verification result that identity verification is passed or fails is output. In the present application, during verification of an identity of the requester, an eyeball moving track of the requester is verified to realize human-machine safety verification, and whether the requester is a real person or a machine attack is identified automatically, thus improving a reliability of the human-machine safety verification.

In addition, with the technical solution of the present application, since the eyeball gaze point track on the identity verification page is collected automatically to verify the eyeball moving track of the requester during the verification of the identity of the requester, a user operation is avoided, and the eyeball moving track may be verified under the condition that a user hardly or slightly perceives, which does not increase a difficulty of understanding by a real person, and meanwhile improves user experiences.

It should be understood that various forms of the flows shown above may be used and reordered, and steps may be added or deleted. For example, the steps described in the present application may be executed in parallel, sequentially, or in different orders, which is not limited herein as long as the desired results of the technical solution disclosed in the present application may be achieved.

The above-mentioned implementations are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A human-machine verification method, comprising:
   receiving an identity verification request sent by a requester, and collecting an eyeball gaze point track on an identity verification page; wherein the identity verification request comprises identity verification information;

identifying whether the identity verification information is correct based on pre-stored user identity information;

if the identity verification information is correct, performing classification based on the eyeball gaze point track on the identity verification page using a first classification model, and outputting a first probability value indicating whether the requester is a real person or a machine; and determining based on the first probability value that the requester is the real person or the machine, and outputting an identity verification result indicating that identity verification is passed or fails.

2. The method of claim 1, further comprising:

if the identity verification information is incorrect, outputting an identity verification result indicating that the identity verification fails.

3. The method of claim 1, wherein the receiving the identity verification request sent by the requester, and collecting the eyeball gaze point track on the identity verification page comprises:

in response to receiving a request of the requester for accessing the identity verification page, starting to collect the eyeball gaze point track on the identity verification page; and receiving the identity verification request sent after the requester inputs a user name and a password, wherein the identity verification information comprises the user name and the password.

4. The method of claim 1, wherein the determining based on the first probability value that the requester is the real person or the machine and outputting the identity verification result indicating that identity verification is passed or fails comprises:

if determining based on the first probability value that a probability value of the requester being the real person is greater than a probability value of the requester being the machine, determining that the requester is the real person and outputting the identity verification result indicating that the identity verification is passed; or if determining based on the first probability value that the probability value of the requester being the machine is greater than a first preset value, determining that the requester is the machine and outputting the identity verification result indicating that the identity verification fails; or if determining based on the first probability value that the probability value of the requester being the real person is greater than a second preset value, determining that the requester is the real person and outputting the identity verification result indicating that the identity verification is passed.

5. The method of claim 4, wherein the determining based on the first probability value that the requester is the real person or the machine and outputting the identity verification result indicating that identity verification is passed or fails further comprises:

if determining based on the first probability value that the probability value of the requester being the real person is equal to the probability value of the requester being the machine, or that the probability value of the requester being the machine is greater than a third preset value but not greater than the first preset value, or that the probability value of the requester being the real person is greater than a fourth preset value but not greater than the second preset value, displaying on an interactive verification page verification contents with difficulties corresponding to the probability value of the requester being the machine and prompt information for prompting an operation of the requester;

collecting a behavior track of the requester on the interactive verification page;

determining whether the operation of the requester is correct based on the behavior track of the requester on the interactive verification page; and outputting the identity verification result indicating that the identity verification is passed or fails according to whether the operation of the requester is correct.

6. The method of claim 5, further comprising:

after the displaying on the interactive verification page verification contents with difficulties corresponding to the probability value of the requester being the machine and prompt information for prompting the operation of the requester, collecting an eyeball gaze point track on the interactive verification page;

performing classification based on the eyeball gaze point track on the interactive verification page using a second classification model, and outputting a second probability value indicating whether the requester is the real person or the machine; and determining based on the second probability value that the requester is the real person or the machine to obtain an intermediate result;

wherein the outputting the identity verification result indicating that the identity verification is passed or fails according to whether the operation of the requester is correct comprises:

outputting the identity verification result indicating that the identity verification is passed or fails according to whether the operation of the requester is correct and the intermediate result.

7. The method of claim 6, further comprising:

comparing whether the eyeball gaze point track on the interactive verification page is consistent with the eyeball gaze point track on the identity verification page, so as to obtain a comparison result;

wherein the outputting the identity verification result indicating that the identity verification is passed or fails according to whether the operation of the requester is correct and the intermediate result comprises:

outputting the identity verification result indicating that the identity verification is passed or fails according to whether the operation of the requester is correct, the intermediate result, and the comparison result.

8. The method of claim 7, wherein the outputting the identity verification result indicating that the identity verification is passed or fails according to whether the operation of the requester is correct, the intermediate result, and the comparison result comprises:

if the operation of the requester is correct, the intermediate result indicates that the requester is the real person, and the comparison result indicates that the eyeball gaze point track on the interactive verification page is consistent with the eyeball gaze point track on the identity verification page, determining that the requester is the real person, and outputting the identity verification result indicating that the identity verification is passed;

if the operation of the requester is incorrect, and/or the intermediate result indicates that the requester is the machine, and/or the comparison result indicates that the eyeball gaze point track on the interactive verification page is inconsistent with the eyeball gaze point track on the identity verification page, determining that the requester is the machine, and outputting the identity verification result indicating that the identity verification fails.

9. An electronic device, comprising:
at least one processor; and
a memory connected with the at least one processor communicatively;
wherein the memory stores instructions executable by the at least one processor to enable the at least one processor to carry out a human-machine verification method, which comprises:
receiving an identity verification request sent by a requester, and collecting an eyeball gaze point track on an identity verification page; wherein the identity verification request comprises identity verification information;
identifying whether the identity verification information is correct based on pre-stored user identity information;
if the identity verification information is correct, performing classification based on the eyeball gaze point track on the identity verification page using a first classification model, and outputting a first probability value indicating whether the requester is a real person or a machine; and
determining based on the first probability value that the requester is the real person or the machine, and outputting an identity verification result indicating that identity verification is passed or fails.

10. The electronic device of claim 9, wherein the receiving the identity verification request sent by the requester, and collecting the eyeball gaze point track on the identity verification page comprises:
in response to receiving a request of the requester for accessing the identity verification page, starting to collect the eyeball gaze point track on the identity verification page; and
receiving the identity verification request sent after the requester inputs a user name and a password, wherein the identity verification information comprises the user name and the password.

11. The electronic device of claim 9, wherein the determining based on the first probability value that the requester is the real person or the machine and outputting the identity verification result indicating that identity verification is passed or fails comprises:
if determining based on the first probability value that a probability value of the requester being the real person is greater than a probability value of the requester being the machine, determining that the requester is the real person and outputting the identity verification result indicating that the identity verification is passed; or
if determining based on the first probability value that the probability value of the requester being the machine is greater than a first preset value, determining that the requester is the machine and outputting the identity verification result indicating that the identity verification fails; or
if determining based on the first probability value that the probability value of the requester being the real person is greater than a second preset value, determining that the requester is the real person and outputting the identity verification result indicating that the identity verification is passed.

12. The electronic device of claim 11, wherein the determining based on the first probability value that the requester is the real person or the machine and outputting the identity verification result indicating that identity verification is passed or fails further comprises:
if determining based on the first probability value that the probability value of the requester being the real person is equal to the probability value of the requester being the machine, or that the probability value of the requester being the machine is greater than a third preset value but not greater than the first preset value, or that the probability value of the requester being the real person is greater than a fourth preset value but not greater than the second preset value, displaying on an interactive verification page verification contents with difficulties corresponding to the probability value of the requester being the machine and prompt information for prompting an operation of the requester;
collecting a behavior track of the requester on the interactive verification page;
determining whether the operation of the requester is correct based on the behavior track of the requester on the interactive verification page; and
outputting the identity verification result indicating that the identity verification is passed or fails according to whether the operation of the requester is correct.

13. The electronic device of claim 12, wherein the method further comprises:
after the displaying on the interactive verification page verification contents with difficulties corresponding to the probability value of the requester being the machine and prompt information for prompting the operation of the requester,
collecting an eyeball gaze point track on the interactive verification page;
performing classification based on the eyeball gaze point track on the interactive verification page using a second classification model, and outputting a second probability value indicating whether the requester is the real person or the machine; and
determining based on the second probability value that the requester is the real person or the machine to obtain an intermediate result;
wherein the outputting the identity verification result indicating that the identity verification is passed or fails according to whether the operation of the requester is correct comprises:
outputting the identity verification result indicating that the identity verification is passed or fails according to whether the operation of the requester is correct and the intermediate result.

14. The electronic device of claim 13, wherein the method further comprises:
comparing whether the eyeball gaze point track on the interactive verification page is consistent with the eyeball gaze point track on the identity verification page, so as to obtain a comparison result;
wherein the outputting the identity verification result indicating that the identity verification is passed or fails according to whether the operation of the requester is correct and the intermediate result comprises:
outputting the identity verification result indicating that the identity verification is passed or fails according to whether the operation of the requester is correct, the intermediate result, and the comparison result.

15. The electronic device of claim 14, wherein the outputting the identity verification result indicating that the identity verification is passed or fails according to whether the operation of the requester is correct, the intermediate result, and the comparison result comprises:
  if the operation of the requester is correct, the intermediate result indicates that the requester is the real person, and the comparison result indicates that the eyeball gaze point track on the interactive verification page is consistent with the eyeball gaze point track on the identity verification page, determining that the requester is the real person, and outputting the identity verification result indicating that the identity verification is passed;
  if the operation of the requester is incorrect, and/or the intermediate result indicates that the requester is the machine, and/or the comparison result indicates that the eyeball gaze point track on the interactive verification page is inconsistent with the eyeball gaze point track on the identity verification page, determining that the requester is the machine, and outputting the identity verification result indicating that the identity verification fails.

16. A non-transitory computer-readable storage medium comprising instructions, which, when executed by a computer, causes the computer to carry out a human-machine verification method, which comprises:
  receiving an identity verification request sent by a requester, and collecting an eyeball gaze point track on an identity verification page; wherein the identity verification request comprises identity verification information;
  identifying whether the identity verification information is correct based on pre-stored user identity information;
  if the identity verification information is correct, performing classification based on the eyeball gaze point track on the identity verification page using a first classification model, and outputting a first probability value indicating whether the requester is a real person or a machine; and
  determining based on the first probability value that the requester is the real person or the machine, and outputting an identity verification result indicating that identity verification is passed or fails.

17. The non-transitory computer-readable storage medium of claim 16, wherein the receiving the identity verification request sent by the requester, and collecting the eyeball gaze point track on the identity verification page comprises:
  in response to receiving a request of the requester for accessing the identity verification page, starting to collect the eyeball gaze point track on the identity verification page; and
  receiving the identity verification request sent after the requester inputs a user name and a password, wherein the identity verification information comprises the user name and the password.

18. The non-transitory computer-readable storage medium of claim 16, wherein the determining based on the first probability value that the requester is the real person or the machine and outputting the identity verification result indicating that identity verification is passed or fails comprises:
  if determining based on the first probability value that a probability value of the requester being the real person is greater than a probability value of the requester being the machine, determining that the requester is the real person and outputting the identity verification result indicating that the identity verification is passed; or
  if determining based on the first probability value that the probability value of the requester being the machine is greater than a first preset value, determining that the requester is the machine and outputting the identity verification result indicating that the identity verification fails; or
  if determining based on the first probability value that the probability value of the requester being the real person is greater than a second preset value, determining that the requester is the real person and outputting the identity verification result indicating that the identity verification is passed.

19. The non-transitory computer-readable storage medium of claim 18, wherein the determining based on the first probability value that the requester is the real person or the machine and outputting the identity verification result indicating that identity verification is passed or fails further comprises:
  if determining based on the first probability value that the probability value of the requester being the real person is equal to the probability value of the requester being the machine, or that the probability value of the requester being the machine is greater than a third preset value but not greater than the first preset value, or that the probability value of the requester being the real person is greater than a fourth preset value but not greater than the second preset value, displaying on an interactive verification page verification contents with difficulties corresponding to the probability value of the requester being the machine and prompt information for prompting an operation of the requester;
  collecting a behavior track of the requester on the interactive verification page;
  determining whether the operation of the requester is correct based on the behavior track of the requester on the interactive verification page; and
  outputting the identity verification result indicating that the identity verification is passed or fails according to whether the operation of the requester is correct.

20. The non-transitory computer-readable storage medium of claim 19, wherein the method further comprises:
  after the displaying on the interactive verification page verification contents with difficulties corresponding to the probability value of the requester being the machine and prompt information for prompting the operation of the requester,
  collecting an eyeball gaze point track on the interactive verification page;
  performing classification based on the eyeball gaze point track on the interactive verification page using a second classification model, and outputting a second probability value indicating whether the requester is the real person or the machine; and
  determining based on the second probability value that the requester is the real person or the machine to obtain an intermediate result;
  wherein the outputting the identity verification result indicating that the identity verification is passed or fails according to whether the operation of the requester is correct comprises:
  outputting the identity verification result indicating that the identity verification is passed or fails according to whether the operation of the requester is correct and the intermediate result.

* * * * *